INVENTORS:
HERBERT WOJAHN, ERNST AUGUST KLEINHEIDT, HEINRICH GOLD.
BY
Plumley, Tyner & Sandt
ATTORNEYS 3,575,880
PROCESS FOR THE PREPARATION OF A SOLVENT-FREE, AQUEOUS, NEUTRAL CYANURIC CHLORIDE SUSPENSION
Heinzbert Wojahn, Leverkusen, and Ernst August Kleinheidt and Heinrich Gold, Cologne-Stammheim, Germany, assignors to Farbenfabriken Bayer Aktiengesellschaft, Leverkusen, Germany
Filed Aug. 4, 1967, Ser. No. 658,067
Claims priority, application Germany, Aug. 11, 1966, F 49,921
Int. Cl. B01j 13/00
U.S. Cl. 252—311                                                     8 Claims

ABSTRACT OF THE DISCLOSURE

Neutral, aqueous suspensions of cyanuric chloride, free from organic solvents are prepared by passing molten cyanuric chloride into water maintained at about 146 to 200° C. while maintaining the ratio of water to cyanuric chloride at not below 1:1.

---

It is known that suspensions of cyanuric chloride are obtained by dissolving cyanuric chloride in a sufficient amount of an organic, water-miscible solvent such as acetone or dioxane to effect solution, and running this solution into water. The disadvantages of using an organic solvent manifest themselves by the fact that hydrolysis occurs as soon as such a solution of cyanuric chloride is mixed with water. It is also known that solid cyanuric chloride such as is obtained by pulverising solidified cyanuric chloride melt or by condensing cyanuric chloride vapour can be converted into a suspension by stirring it together with water below 20° C., if desired together with small quantities of a wetting agent.

Figure 3:
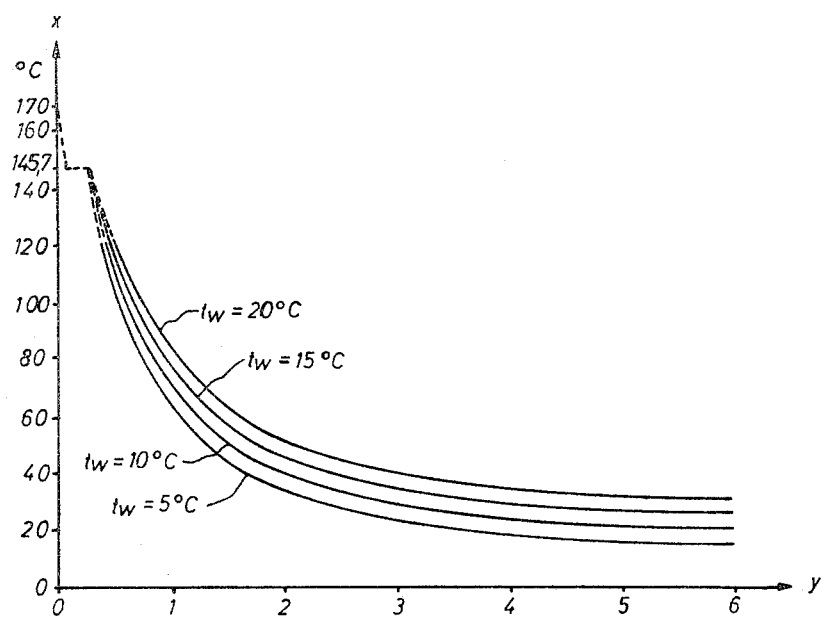

It has now unexpectedly been found that a neutral aqueous suspension of cyanuric chloride free from organic solvents is obtained when molten cyanuric chloride is run into water. In carrying out the process, the temperature of the molten cyanuric chloride may lie above the melting point of the cyanuric chloride, at about 146 to about 200° C.; the temperature of the melt is preferably between 110 and 180° C. and, most preferably, between 160 and 180° C. The temperature of the water is kept at about 0 to 20° C., preferably 10 to 15° C. The proportion by weight of water to cyanuric chloride may be varied according to requirements but will generally not be below a ratio of about 1:1. A ratio by weight of water to cyanuric chloride of, for example, about 4:1 to about 6:1 is preferred. The temperature of the aqueous cyanuric chloride suspension, resulting from the proportion of water to cyanuric chloride, the temperature of the molten cyanuric chloride and the temperature of the water, can be determined from the graph which constitutes FIG. 3 of the accompanying drawings. In the graph the ordinate X denotes the temperature of the aqueous cyanuric chloride suspension and the abscissa Y denotes the ratio $m$=water:cyanuric chloride. $t_w$ Denotes the temperature of water. The melting point of cyanuric chloride is 145.7° C. The temperature of the resulting aqueous cyanuric chloride suspension may, if desired be lowered by indirect cooling.

In a preferred embodiment of the process of the invention, the cyanuric chloride melt is run into highly turbulent or flowing water. This may be done by for example, running molten cyanuric chloride (1 part by weight) at 170° C. into water (5 parts by weight) at 5° C. which is kept in a state of turbulence in a container equipped with stirrer.

In a particular embodiment, the cyanuric chloride melt can be introduced into flowing water, the proportions indicated above being observed. This particular embodiment may, for example, be carried out by producing the stream of water on the internal wall of a vertical cylinder and introducing the molten cyanuric chloride at the top of the cylinder as illustrated diagrammatically in FIG. 1 of the accompanying drawings through a heatable nozzle which is suitable for spraying, or injecting the cyanuric chloride melt into water which is agitated in a vessel equipped with a stirrer and provided with constant inflow and outflow, or by spraying according to FIG. 2 the water 7 and the cyanuric chloride melt 8 into a receiver 10 through a 2-material nozzle 9 as illustrated diagrammatically in FIG. 2 of the accompanying drawings in which the outlet aperture of the cyanuric chloride melt is heatable, and thereafter continuing the reaction of the resulting aqueous suspension of cyanuric chloride 11 in the usual manner, in each case after first breaking up the material into smaller particles.

In order to work up the product subsequently it is advisable to effect suitable particle size distribution, for example by means of a wet grinding apparatus. In some cases it may be advisable to add one of the usual commercial wetting agents to the water. Suitable wetting agents of this type are, for example, the reaction products of fatty alcohols with ethylene oxide, and sulphonic acid derivatives of aliphatic hydrocarbons. If wetting agents are used, they are added in quantities of about 0.001 to 1.0% by weight, preferably 0.05 to 0.5% by weight of the amount of water.

Since hydrolysis of cyanuric chloride is known to take place even at room temperature it was by no means to be expected that a neutral aqueous cyanuric chloride suspension would be obtained by introducing a cyanuric chloride melt at a temperature of about 146 to about 200° C. into water. This is all the more surprising since acid chlorides are known to react explosively with water at elevated temperatures.

The process according to the invention affords considerable advantages over the state of the art. It is possible by this process to make use of the greater ease with which liquids can be dosed, a factor which brings considerable advantages especially for carrying out continuous processes. A further advantage of this process is that the liquid cyanuric chloride obtained can be used immediately without further working up in certain manufacturers processes. The aqueous cyanuric chloride suspensions obtainable according to the invention are eminently suitable for the production of plant protective agents, optical brightening agents and reactive dyes, for example those which are described in the Belgian patent specification 543,216.

EXAMPLE

Figure 1:
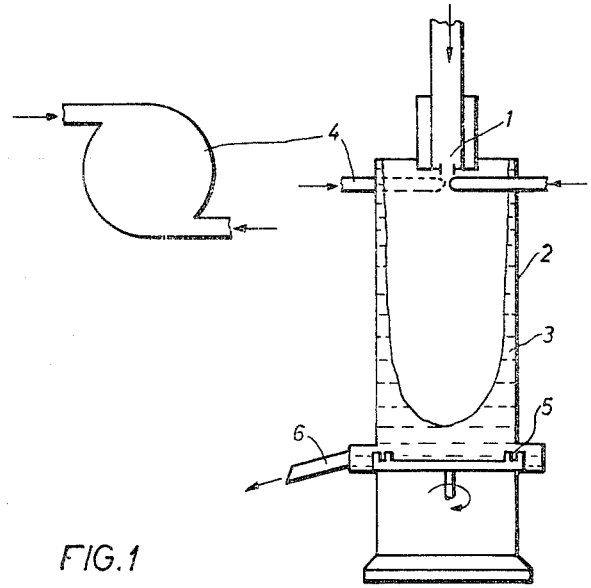
Figure 2:
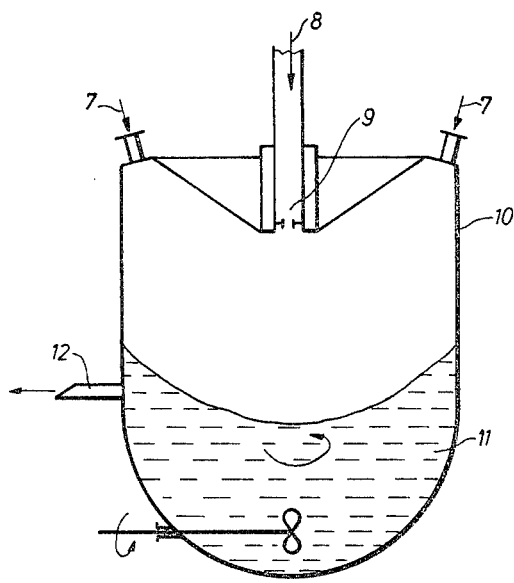

Using an apparatus as shown in FIG. 1 of the accompanying drawings molten cyanuric chloride is introduced under pressure through the heated nozzle 1 at a temperature of 170° C. and at a rate of 150 kg. per hour. The jet from the nozzle enters the mixing tube 2. Because of its high turbulence, the stream is already atomised into individual droplets. A continuous film of water 3, at a temperature of 10° C., washes over the internal wall of the mixing tube. The film of water is produced at the upper edge of the tube by tangential inflow means 4. The water is fed in at the rate of 700 litres per hour. As the cyanuric chloride enters the water, loose agglomerates are formed, which are broken down into the desired particle size (less than or equal to 100 μm.) in an adjacent wet grinding mill 5. By maintaining the above mentioned rates of throughput, a neutral aqueous suspension of uniform composition and particle size is obtained. The amount of suspension 6 discharged per hour contains 150 kg. of finely divided cyanuric chloride in 700 litres of water, and this suspension is at a temperature of 26° C.

It may be advisable to add to the inflowing water, as wetting agent, 0.1% of the reaction product of 1 mol of dodecyl alcohol and 5 mols of ethylene oxide to facilitate subsequent working up of the cyanuric chloride.

What we claim is:
1. A process for the production of a neutral aqueous suspension of cyanuric chloride free from organic solvents, characterized in that cyanuric chloride at a temperature in the range of about 146 to about 200° C. is passed into water which is maintained at about 0 to 20° C., the proportion of water to cyanuric chloride being maintained at a ratio of not below about 1:1.
2. A process as claimed in claim 1 in which the temperature of the molten cyanuric chloride is from 110 to 180° C.
3. A process as claimed in claim 1 in which the ratio is from 4:1 to 6:1.
4. A process as claimed in claim 1 in which the temperature of the water is from 10° to 15° C.
5. A process as claimed in claim 1 in which the cyanuric chloride is introduced into highly turbulent or flowing water.
6. A process as claimed in claim 1 in which a wetting agent selected from the group consisting of the reaction products of fatty alcohols with ethylene oxide and the sulfonic acid derivatives of aliphatic hydrocarbons is added to the water.
7. A process as claimed in claim 6 in which the amount of wetting agent is from 0.001 to 1.0% by weight based on the weight of water.
8. A process as claimed in claim 7 in which the amount of wetting agent is from 0.05 to 0.5%.

References Cited
UNITED STATES PATENTS 2,676,963   3/1954   Rottschaeffer et al. __ 260—248C

FOREIGN PATENTS 1,141,973   1/1963   Germany.

JOHN D. WELSH, Primary Examiner

U.S. Cl. X.R.

252—310; 260—248

UNITED STATES PATENT OFFICE
CERTIFICATE OF CORRECTION

Patent No. 3,575,880  Dated April 20, 1971

Inventor(s) Wojahn, Heinzbert et al.

It is certified that error appears in the above-identified patent and that said Letters Patent are hereby corrected as shown below:

Page 1, lines 42-45 inclusive should read

---melting point of the cyanuric chloride, at about 146 to about 200°C; the temperature of the melt is preferably between 160 and 180°C. The temperature of the water is kept at---

In Claim 3, at column 3, line 14,
"110" should be ---160---.

Signed and sealed this 4th day of January 1972.

(SEAL)
Attest:

EDWARD M. FLETCHER, JR.  ROBERT GOTTSCHALK
Attesting Officer  Acting Commissioner of Pat